(12) United States Patent
Groves et al.

(10) Patent No.: US 11,331,592 B1
(45) Date of Patent: May 17, 2022

(54) SALT RECOVERY SYSTEM

(71) Applicant: OLIMAX INC, Freeland, WA (US)

(72) Inventors: Oliver James Groves, Freeland, WA (US); Mark James Groves, Meridian, ID (US); Shad James Groves, Long Beach, CA (US)

( * ) Notice: Subject to any disclaimer, the term of this patent is extended or adjusted under 35 U.S.C. 154(b) by 0 days.

(21) Appl. No.: 17/411,075

(22) Filed: Aug. 25, 2021

(51) Int. Cl.
| | |
|---|---|
| *B01D 1/00* | (2006.01) |
| *B01D 3/10* | (2006.01) |
| *C02F 1/04* | (2006.01) |
| *B01D 1/30* | (2006.01) |

(52) U.S. Cl.
CPC ......... *B01D 1/0047* (2013.01); *B01D 1/0082* (2013.01); *B01D 3/106* (2013.01); *B01D 1/30* (2013.01); *C02F 1/043* (2013.01)

(58) Field of Classification Search
CPC ...... B01D 1/0047; B01D 1/0082; B01D 1/30; B01D 3/106; C02F 1/043
See application file for complete search history.

(56) References Cited

U.S. PATENT DOCUMENTS

| | | | | | |
|---|---|---|---|---|---|
| 4,083,781 | A | * | 4/1978 | Conger | C02F 1/04 210/651 |
| 5,980,695 | A | * | 11/1999 | Cox | B01D 3/42 202/166 |
| 6,030,535 | A | * | 2/2000 | Hayashi | B01D 61/04 210/652 |
| 6,294,054 | B1 | * | 9/2001 | Sutter | B01D 3/10 202/176 |
| 6,391,162 | B1 | * | 5/2002 | Kamiya | C02F 1/14 203/11 |
| 6,833,056 | B1 | * | 12/2004 | Kamiya | B01D 1/0052 202/155 |
| 8,795,531 | B2 | * | 8/2014 | Takeuchi | C02F 9/00 210/639 |
| 9,776,102 | B2 | * | 10/2017 | Frick | C02F 1/16 |
| 10,039,996 | B2 | * | 8/2018 | Frick | B01D 3/007 |
| 10,166,489 | B2 | * | 1/2019 | Frick | B01D 5/006 |
| 10,207,935 | B2 | * | 2/2019 | Beitelmal | C02F 1/14 |
| 2017/0217789 | A1 | * | 8/2017 | Beitelmal | B01D 61/12 |

* cited by examiner

*Primary Examiner* — Jonathan Miller (57) ABSTRACT

A salt recovery system, comprising: a) a salt recovery tank, configured to receive and hold brine; b) a fluid tank, configured to hold a fluid and comprising a heater configured and heat the fluid in the fluid tank; c) a heat exchanger pipe, configured to receive the fluid from the fluid tank, to enable heat exchange between the fluid in the heat exchanger pipe and the brine in the salt recovery tank, and to release the fluid into the fluid tank; d) a circulation pump configured for driving a circulation of the fluid from the fluid tank, through the heat exchanger pipe, and back into the fluid tank; e) a first vacuum pump configured to lower pressure inside the salt recovery tank and to pump the water vapor out the salt recovery tank; f) a recycled water tank, configured to receive the water vapor from the first vacuum pump.

20 Claims, 10 Drawing Sheets

SALT RECOVERY SYSTEM

TECHNICAL FIELD

The present application, in some embodiments thereof, relates to salt recovery system to recover salt from brine.

BACKGROUND

Brine is a solution of water and salt, in which salt is at least 26% of the solution by weight. Brine may be a byproduct of water desalination systems and may be thrown away. However, the high concentration of salt may pollute the ground and water into which brine is thrown. Moreover, by throwing away brine, salt that may be reusable is wasted.

BRIEF SUMMARY OF THE INVENTION

An aim of the system of the present invention is to provide a salt recovery system that separates brine into water and salt. The water may be recycled and use for a variety of functions, such as agriculture, gray water, or potable water. The salt may be used in many industries. In this manner, pollution caused by the dumping of brine into soil or bodies of water (rivers, lakes, etc.) is prevented while the water and salt can be reused.

Therefore, an aspect of some embodiments of the present invention relates to a salt recovery system, comprising a salt recovery tank, a fluid tank, a heat exchange pipe, a circulation pipe, a first vacuum pump, and a recycled water tank. The salt recovery tank is configured to receive and hold brine. The fluid tank is configured to hold a fluid and comprises a heater configured and heat the fluid in the fluid tank. The heat exchanger pipe comprises an inlet, a heat exchanging portion, and an outlet. The inlet is located outside the salt recovery tank and is configured to receive the fluid from the fluid tank. The heat exchanging portion extends inside the salt recovery tank and is configured to enable heat exchange between the fluid in the heat exchanger pipe and the brine in the salt recovery tank. The outlet is outside the salt recovery tank and is configured to release the fluid into the fluid tank. The circulation pump is configured for driving a circulation of the fluid from the fluid tank, through the heat exchanger pipe, and back into the fluid tank. The first vacuum pump is configured to lower pressure inside the salt recovery tank, to facilitate evaporation of water in the brine and separation of the brine into water vapor and salt at a desired temperature, the first vacuum pump being configured to pump the water vapor out the salt recovery tank, such that salt remains in the salt recovery tank. The recycled water tank, configured to receive the water vapor from the first vacuum pump.

In a variant, the salt recovery system further comprises a second vacuum pump. The first vacuum pump is configured to lower the pressure inside the salt recovery tank to a first pressure and to extract the water vapor at a first pumping speed. The second vacuum pump is configured to maintain the pressure inside the salt recovery tank at a second pressure higher than the first pressure and to extract the water vapor at a second pumping speed higher than the first pumping speed. The salt recovery system comprises a first valve between the salt recovery tank and the first vacuum pump, and a second valve between the salt recovery tank the second vacuum pump. The first vacuum pump is configured to be operated with the first valve open to lower the pressure in the salt recovery tank to the first pressure and to extract the water vapor from the salt recovery tank at the first pumping speed for a predetermined time period, while the second vacuum pump is operated to warm up with the second valve closed. At the end of the predetermined time period, the first valve is configured to be closed and the second valve is configured to be opened such that the second vacuum pump maintains the pressure within the salt recovery tank at the second pressure and extracts water vapor from the salt recovery tank at the second pumping speed.

In another variant, the salt recovery system is configured to receive the brine from a water desalination system into the salt recovery tank. The recycled water tank is associated with a pump configured to circulate recycled water generated by a liquefying of the water vapor into the water desalination system.

In some embodiments of the present invention, the salt recovery tank comprises a trough and a lid, the lid being removably joined to the trough and configured to selectively open and close the trough. When the lid is closed, the lid and trough enclose an inner cavity, sealing the inner cavity from an outer environment outside the salt recovery tank, to at least decrease entry of air from the outer environment into the inner cavity.

In a variant, the salt recovery system comprises a first fluid line connecting the fluid tank to the inlet and a second fluid line connecting the outlet to the fluid tank, wherein the first fluid line and the second fluid line are compliant.

In another variant, the trough has a first lip extending horizontally outward from a rim of the trough. The lid has a second lip extending horizontally outward from a rim of the lid. When the lid closed the trough, the first lip is aligned with the second lip.

The salt recovery system may include a sealing unit located between the first lip and the second lip, configured to enhance sealing of the inner cavity from the outer environment.

In yet another variant, the heat exchanger pipe is joined to the lid, such that the inlet ad outlet are located outside the lid and traverse the lid to connect to the heat exchanging portion.

The heat exchanging portion may extend toward the trough, such that when the lid closes the trough the heat exchanging portion is at least partially inside the trough.

In a further variant, the lid is joined to the trough via at least one hinge, and is configured to be rotated around the hinge to open and close the trough.

The salt recovery system may comprise at least one cradle configured to support the lid when the lid is opened.

In a variant, the salt recovery system comprises a vacuum gauge configured for measuring and displaying an air pressure inside the salt recovery tank.

In another variant, the salt recovery system comprises a first temperature sensor configured to measure and display a temperature of the fluid in the fluid tank.

The salt recovery system may comprise a second temperature sensor configured to measure and display a temperature of the fluid in the fluid tank.

The salt recovery system may comprise a flow control unit configured to: receive a first temperature measurement from the first temperature probe and a second temperature measurement from the second temperature probe; compare the first temperature measurement to a first threshold temperature; compare the second temperature measurement to a second threshold temperature; enable an activation by a user of the circulation pump, when the first temperature of the measurement is higher than the first threshold temperature and the second temperature of the measurement is higher than the second threshold temperature.

In a variant, the salt recovery system comprises a lifting apparatus to move the lid to open and close the trough, wherein the lifting apparatus comprises a horizontal support panel, upon which the trough is fixed, at least two rails parallel to each other and disposed on the horizontal support panel, and a crane assembly configured to move along the at least two rails. The crane assembly comprises: two vertical grooved beams, horizontal supports, a bar, wheels, a movable beam, two sprockets, a horizontal shaft, two chains, a counterweight, and a strongback. The two vertical grooved beams each have a vertical groove, the vertical grooves facing each other, each vertical grooved beams having a forward face facing the trough and a rear face facing away from the trough. The horizontal supports support the vertical beams and extend horizontally below the grooved vertical beams parallel to and aligned with the rails. The bar connects the horizontal supports. The wheels are joined to a lower surface of the horizontal supports and configured to cooperate with the rails to move the crane assembly along the rails. The movable beam is located between the vertical grooved beams and is constrained by the vertical grooves to move vertically along the vertical grooves. The two sprockets are parallel to each other, each sprocket being located on a respective vertical grooved beam. The horizontal shaft is perpendicular to the sprockets and to the vertical grooved beams and traverses centers of the sprockets, the horizontal shaft is fixedly joined to the sprockets, to cause a rotation of one of sprocket to generate same rotation on another one of the sprockets. The two chains cooperating with respective sprockets, each chain and having a first end and a second end. The counterweight is joined to the first ends of the chains and is located behind vertical grooved beams. The strongback is joined to the second ends of the chains and to a front surface of the movable beam, the strongback being joined to lid. The counterweight behind the vertical beams balances a combined weight of the lid, the strongback, and the movable beam, such that pushing down on the counterweight causes the sprockets to turn in a first direction and elevate the lid, while pushing down on the lid causes the sprockets to turn in a second direction opposite to the first direction to cause the counterweigh to rise and lid to descend.

In a variant, the salt recovery system further comprises a rear stop, a forward stop, and a spring lock mechanism. The rear stop is joined to the horizontal support panel at or near a rear portion of the horizontal support panel. The forward stop is located on the horizontal support panel ahead of the rear stop, between the rear stop and the trough. The spring locking mechanism attached to a bottom of the bar and configured to: engage with the rear stop when moved over the rear stop, to lock the crane assembly in place in a rear position and preventing the crane assembly from moving along the rails until the spring local mechanism is disengaged by a user from the rear stop; and engage with the forward stop when moved over the forward stop, to lock the crane assembly in place in a forward position and preventing the crane assembly from moving along the rails until the spring local mechanism is disengaged by a user from the forward stop.

In another variant, the salt recovery system further comprises locking pins configured for traversing portions of the movable beam and upper portions of the vertical beams to lock the movable beam on an elevated location, to lock the lid in an elevated position.

In yet another time, the strongback is joined to the movable beam via a rotatable pivot, to enable rotation of the strongback together with the lid with respect to the movable beam.

The salt recovery system may comprise a pin configured to selectively lock the strongback to the movable beam to selectively prevent the rotation of the strongback with respect to the movable beam.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
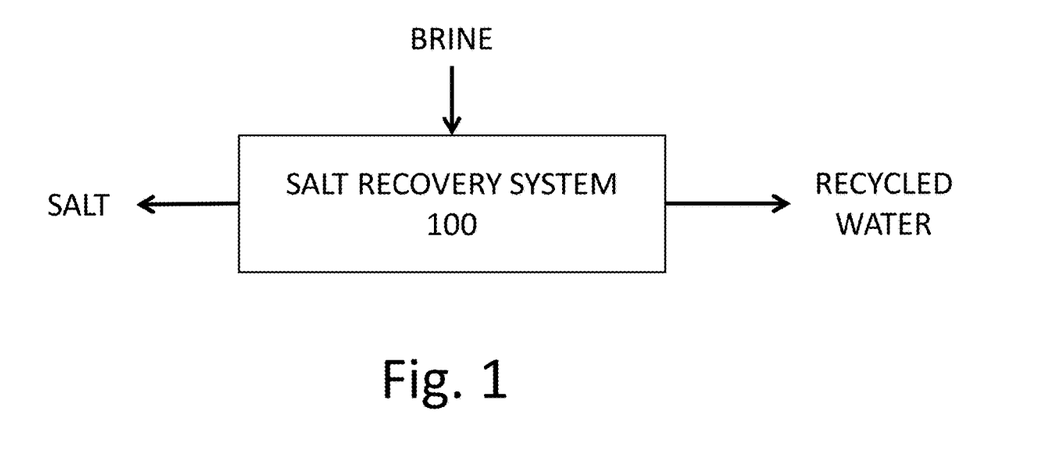
FIG. 1 is a block diagram illustrating a salt recovery system 100 of the present invention receiving brine and separating brine into salt and recycled water.
Figure 2:
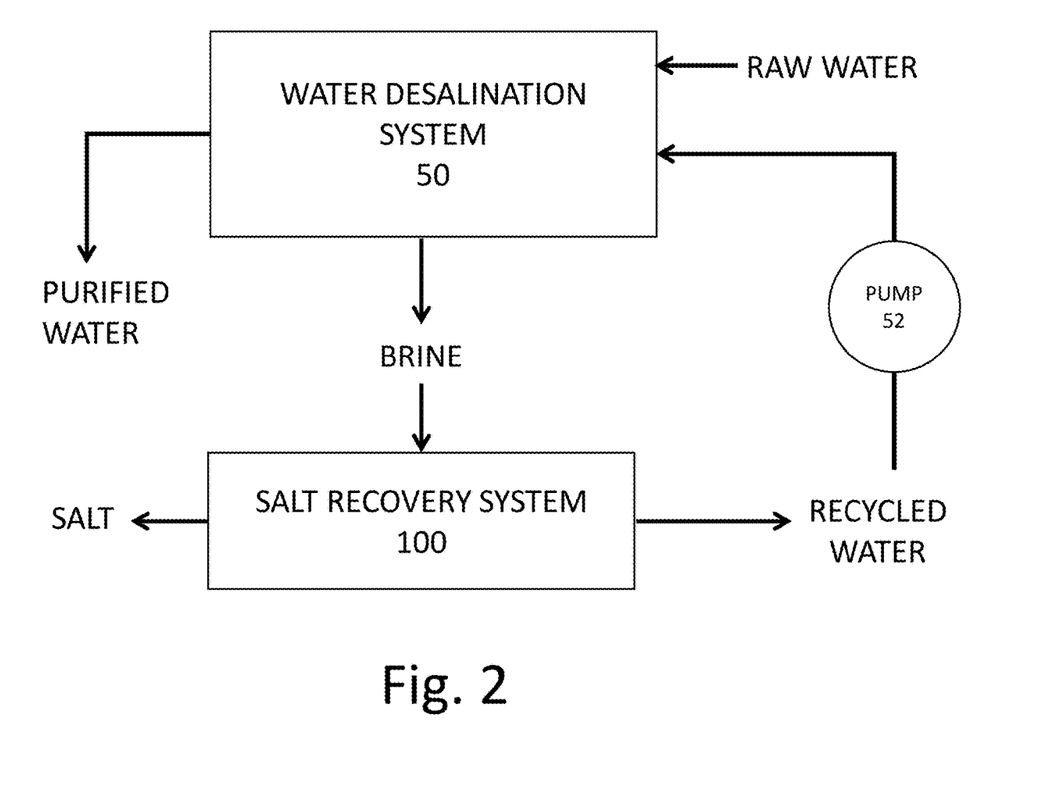
FIG. 2 is a block diagram illustrating a salt recovery system of the present invention receiving brine from a water desalination system, separating the brine into salt and recycled water, so that the recycled water is sent back to the water desalination system for further purification.

Referring now to FIG. 1, a salt recovery system 100 of the present invention is configured to receive brine and to separate the brine into recycled water and salt. In FIG. 2, the salt recovery system 100 is associated with a water desalination system 50. The water desalination system 50 receives raw water from a water source, and produces purified water, with brine being a waste product of process. The brine is received by the salt recovery system 100 of the present invention, and is separated into salt and recycled water. The recycled water is circulated back into the water desalination system 50 via a pump 52 to be purified/desalinated and produce more purified water for a given amount of raw water. In this manner, the use of the salt recovery system 100 of the present invention increases the production of purified water of the water desalination system 50. The separated salt is taken from the salt recovery system 100 and can be sold or used for a variety of functions.

Figure 3A:
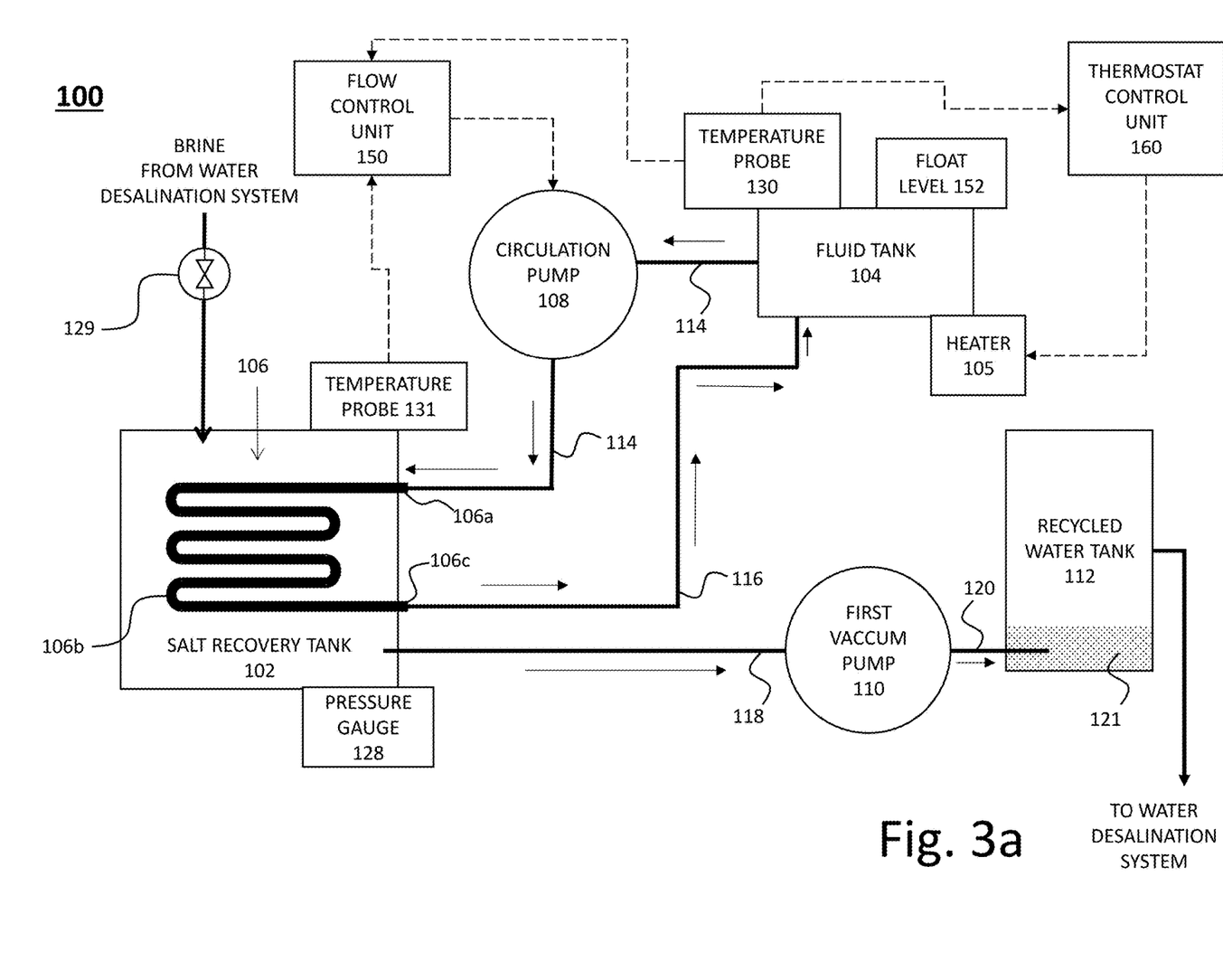
FIG. 3a is a block diagram illustrating a salt recovery system of the present invention.

Reference is now made to FIG. 3a, which is a block diagram illustrating the salt recovery system 100 of the present invention.

The salt recovery system 100 includes a salt recovery tank 102, a fluid tank 104, a heat exchanger pipe 106, a circulation pump 108, a first vacuum pump 110, a recycled water tank 112, and a first water line 114, and a second water line 116.

The salt recovery tank 102 is configured to receive and hold brine therein. The fluid tank 104 is configured to hold a fluid and heat the fluid via a heater 105 that is associated with or integral with the fluid tank 104. In some embodiments of the heater 105 includes a 2400-Watt heating element.

In some embodiments of the present invention, a float level 152 is associated with or part of the fluid tank 104. The float level 152 shows the level of fluid (in liquid form) inside the fluid tank 104. In this manner, a user can see if the level of the fluid 152 is below a threshold level (for example, due evaporation of the fluid out the fluid tank 104 over time), and refill the fluid tank 104 with the fluid.

The heat exchanger pipe 106 includes an inlet 106a, a heat exchanging portion 106b, and outlet 106c. The inlet 106a is located outside the salt recovery tank and is configured to receive the fluid from the fluid tank 104 via the first fluid line 114. The heat exchanging portion 106b extends inside the salt recovery tank 102 and is configured to enable heat exchange between the fluid in the heat exchanger pipe 106 and the brine in the salt recovery tank 102. The outlet 106c is disposed outside the salt recovery tank 102 and is configured to release the fluid from the heat exchanger pipe 106 into the second fluid line 116, which leads the fluid back into the fluid tank 104.

The circulation pump 108 is configured for driving a circulation of the fluid from the fluid tank 104, into the heat exchanger pipe 106 through the first fluid line 114, through the heat exchanger pipe 106, and back into the fluid tank 104 through the second fluid line 116. The circulation pipe may be disposed anywhere along the fluid's path. In some embodiments of the present invention the fluid is deionized water.

The first vacuum pump 110 is configured to lower air pressure inside the salt recovery tank 102, to facilitate evaporation of water in the brine and separation of the brine into water vapor and salt at a desired vacuum pressure and temperature. The first vacuum pump 110 is configured to pump the water vapor out the salt recovery tank 102, such that salt remains in the salt recovery tank 102. In a non-limiting example, the first vacuum pump 110 lowers the pressure in the salt recovery tank to 27-29 inHg or down to 10 mbars. The recycled water tank 112 is configured to receive the water vapor from the first vacuum pump via a first vapor line 118 connecting the salt recovery tank 102 to the first vacuum pump 110 and a second vapor line 120 the first vacuum pump 110 to the recycled water tank 112. Pressure in the recycled water tank 112 is kept at atmospheric pressure, such that the water vapor is liquefied inside the recycled water tank 112. In some embodiments of the present invention, the recycled water tank 112 is partially filled with water before the use of the system 100, and the second vapor line 120 enters the recycled water tank 112 below the level of the water in the recycled water tank 112. In this manner, vapor released by the second line is cooled by the water and more easily turns into liquid recycled water. The prefilled water in the recycled water tank has a temperature lower than the temperature of the vapor entering the recycled water tank 112 via the second vapor line 120.

In some embodiments of the present invention, the recycled water tank 112 is in fluid communication with the water desalination system 50 of FIG. 2, such that the recycled water in circulated from the recycled water tank 112 into the desalination system to produce more purified water.

Figure 3B:
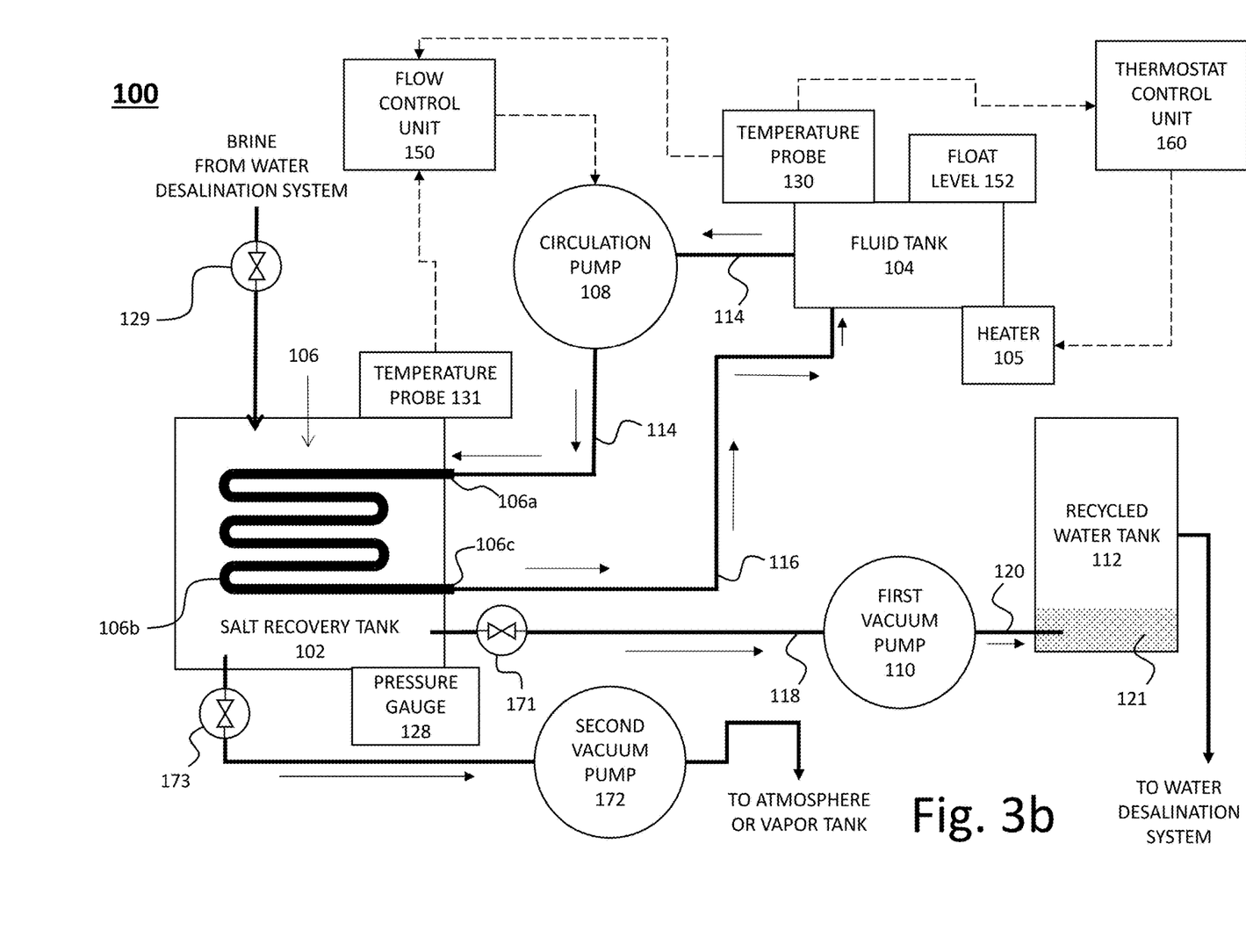
FIG. 3b is a block diagram illustrating a salt recovery system of the present invention, including a second vacuum pump.

FIG. 3b is an embodiment of FIG. 3a, which includes a second vacuum pump 172 in addition to the first vacuum pump 110. The first vacuum pump 110 has a first pumping speed and lowers the pressure of the salt recovery tank to a first pressure. The second vacuum pump 172 has a second pumping speed and lowers the pressure of the salt recovery tank to a second pressure. The first pumping speed is lower than the second pumping speed, which means the second vacuum pump 172 removes more vapor per unit time than the first vacuum pump 110. The first pressure is lower than the second pressure, which means that the first vacuum pump 110 is configured to lower the pressure in the salt recovery tank 102 more than the second vacuum pump 172.

The first vacuum pump 110 extracts vapor from the salt recovery tank 102 and drives the vapor to the recycled water tank 112. The second vacuum pump 172 extracts vapor from the salt recovery tank 102 and exhausts the vapor to the atmosphere and/or to the water desalination system (if present).

Using only the first vacuum pump 110 with low pumping speed would lower the speed of the system 100 as a whole, as water vapor is extracted slowly from the salt recovery tank. Using only the second vacuum pump 172 with high pumping speed would cause the second vacuum pump 172 to pump brine out of the salt recovery tank, as the water in the brine would not evaporate immediately and some liquid brine would be pulled by the second vacuum pump 172 because of the high pumping speed.

Therefore, in operation a first valve 171 leading from the salt recovery tank 102 to the first vacuum pump 110 is opened and the first vacuum pump 110 is turned on to lower the pressure in the salt recovery tank 102 to the first pressure and to slowly draw water vapor from the salt recovery tank 102 and direct the vapor to the recycled water tank 112. Simultaneously, the second vacuum pump 172 is turned on in order to warm up. However, the second valve 173 leading from the salt recovery tank 102 to the second vacuum pump 172 remains closed, in order to prevent the second vacuum pump from drawing liquid brine before the brine has evaporated.

After the pressure in the salt recovery tank has reached the first pressure (e.g. 10 mbar) for a certain time interval (for example 10 minutes), the water in the brine will have turned to vapor. At this point, the first vacuum pump 110 is turned off and the first valve 171 is closed, while the second valve 173 is opened to allow the second vacuum pump 172 to quickly draw the vapor out of the salt recovery tank 102, leaving only salt in the salt recovery tank 102.

Once enough vapor has been removed by the second vacuum pump 172, the second vacuum pump 172 is turned off as well, the salt recovery tank 102 is brought back to atmospheric pressure and opened to remove the solid salt left within.

In some embodiments of the present invention, the first vacuum pump 110 is a rotary vacuum pump configured to lower the pressure in the salt recovery tank 102 to 10 mbar. The rotary vacuum pump has ½-inch-diameter pipe, limiting its pumping speed. The rotary vacuum pump is also known to use oil, which causes some oil to be pumped out along with the vapor. For this reason, the recycled water tank 112 is used to receive the vapor and oil mixture in order to prevent oil vapors to be emitted into the atmosphere. In the recycled water tank 112, the oil vapor condenses to liquid and can be easily separated from the liquid water.

In some embodiments of the present invention, the second vacuum pump 172 is CP-150 CLAWVAC pump configured to achieve a pumping speed between 150 and 180 m³/h and to maintain a pressure of 50 mbar inside the salt recovery tank 102. The CLAWVAC pump has 1¼-inch-diameter pipe. The CLAWVAC pump does not require oil, so the vapor extracted by the CLAWVAC pump can be freely emitted into the atmosphere or sent directly to the water purification system.

Figure 4:
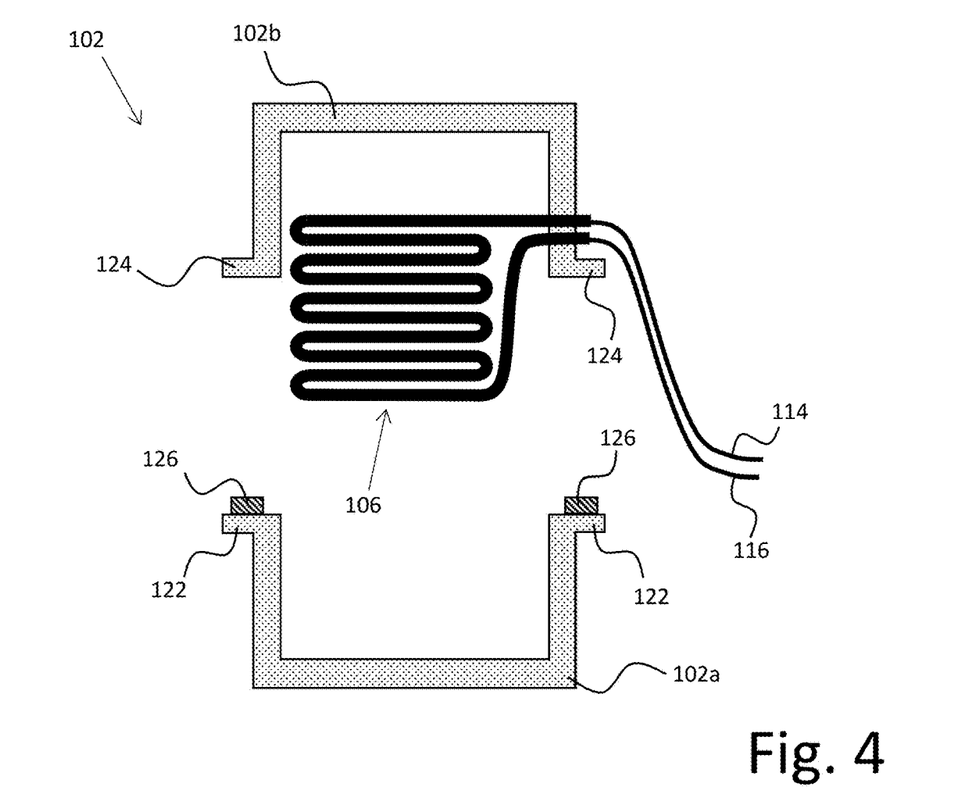
FIG. 4 illustrates a salt recovery tank with a removable lid that is open, according to some embodiments of the present invention.
Figure 5:
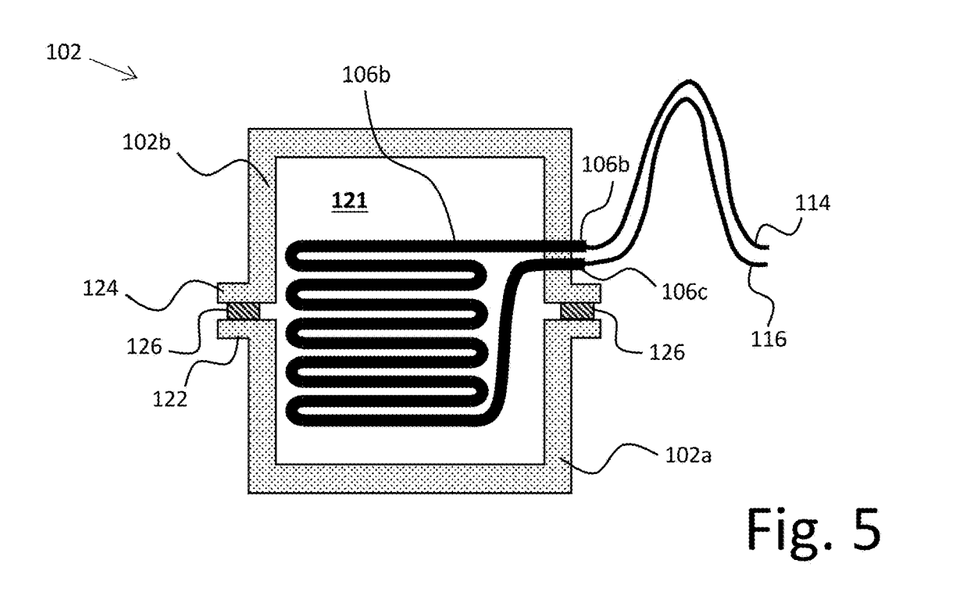
FIG. 5 illustrates a salt recovery tank with a removable lid that is closed, according to some embodiments of the present invention.

FIG. 4 illustrates a salt recovery tank 102 with a lid 102b that is open, according to some embodiments of the present invention. FIG. 5 illustrates the salt recovery tank with lid 102b is closed, according to some embodiments of the present invention.

In some embodiments of the present invention the salt recovery tank 102 includes a trough 102a and a removable lid 102b configured for selectively opening and closing the trough 102a. When the lid 102b closes the trough 102a, an inner cavity is created between the trough 102a and the loid 102b. The inner cavity 121 is sealed from an outer environment, to prevent or decrease air from entering the inner cavity from the outer environment. The better the seal, the easier it is to decrease pressure in the inner cavity 121 via the first vacuum pump 110 of FIG. 3a (and optionally via the second vacuum pump 172 of FIG. 3b).

In some embodiments of the present invention, the trough 102a has a first lip 122 extending horizontally outward from the rim of the trough, while the lid 102b has a second lip 124 extending horizontally outward from the rim of the lid. When the lid closes the trough, the first lip 122 is aligned with the second lip 124. In some embodiments of the present invention, a sealing unit 126 (such as an O-ring, for example) is placed between the first lip 122 and the second lip 124 to enhance the seal between the seal between the inner cavity 121 and the outer environment.

The heat exchanger pipe 106 is joined (for example, fixedly joined) to the lid 102b. The inlet 106a and the outlet 106b are located outside the lid 102b to respectively receive the first fluid line 114 and the second fluid line 116, and traverse the lid 102b to connect to the heat exchanging portion 106b. In some embodiments of the present invention, the heat exchanging portion 106b extends toward the trough 102a. In this manner, when the lid 102b closes the trough 102a, the entire heat exchanging portion 106b is inside the inner cavity 121 and at least part of the heat exchanging portion 106b is inside the trough 102a. In this manner, contact between brine in the trough 102a and the heat exchanging portion 106b is increased, in order to more efficiently heat the brine.

An advantage of having the heat exchanger pipe 106 fixedly joined to the lid 102b lies in the fact that once water has been removed from the brine to yield salt and the lid 102b is opened to collect the salt, the heat exchanger pipe 106 comes out with the lid 102b, allowing easy access to all sections of the trough 102a for collecting the salt. It should be noted that even though the example of the FIGS. 4 and 5 illustrate the heat exchanger pipe 106 to be fixedly joined to the lid 102b, the scope of the present invention also extends to the case in which the heat exchanger pipe 106 is removable joined to the lid 102b, or even joined to the trough 102a.

In the embodiment in which the heat exchanger pipe 106 is joined to the lid 102a, the first fluid line 114 and the second fluid line 116 are made of compliant material, to allow the first fluid line 114 and the second fluid line 116 to be joined to the lid 102b when the lid 102b is removed from the trough 102a.

Referring now to FIGS. 3-5 together, when brine water enters the salt recovery tank 102 (for example via a valve 129, such as a ball valve) and the filling process begins, the brine should not exceed above the bottom of the top first lip 122, in order to allow for the heat exchanging portion 106c to be at least partially submerged in the trough 102a when the lid 102b is closed. Caution should be used when filling the tank to prevent the brine from overflowing. the filling process can be controlled by using the valve 129. After the salt recovery tank 102 is filled with brine as desired, the ball valve 129 is closed and the lid 102b is closed and secured to the trough 102a. The sealing unit 122 seals the inner cavity 121 from the outer environment. The weight of the lid 102b is chosen to provide an adequate vacuum seal. In some embodiments of the present invention, a pressure gauge 128 is joined to the salt recovery tank 102 (for example to the lid 102b), to provide readings of pressure inside the inner cavity 121.

The heater 105 is turned on to heat the fluid in the fluid tank 104 tank to heat up to a desired temperature (for example, approximately 180 to 200 degrees Fahrenheit). In some embodiments of the present invention, a first temperature probe 130 is associated with the fluid tank 104 to measure and display the temperature of the fluid in the fluid tank. In some embodiments of the present invention, a second temperature probe 131 is associated with the salt recovery tank 102 to measure and display the temperature in the salt recovery tank 102.

In some embodiments of the present invention, the system 100 includes a thermostat control unit 160 configured to receive temperature measurements in the fluid tank 104 and to automatically activate the heater 105 when the temperature in the fluid tank 104 is below the first desired temperature. In some embodiments of the present invention, the thermostat control unit is configured to receive an input from a user for defining the first desired temperature in the fluid tank 104.

Once seal of the salt recovery tank 102 is contained and the fluid in the fluid tank 104 has reached a first desired temperature (as measured by the first temperature probe 130), and the second temperature probe 131 measures a temperature in the salt recovery tank 102 that is lower than a second desired temperature, the circulation pump 108 is engaged. In some embodiments of the present invention, a flow control unit 150 receives the temperature in the fluid tank 104 from the first temperature probe 130 and the temperature in the salt recovery tank 102 from the second temperature probe 131. The flow control unit 150 is configured to allow activation of the circulation pump 108 only when the temperature in the fluid tank 104 is at or above the first desired temperature and the temperature in the salt recovery tank 102 is at or above the second desired temperature. The first and second desired temperatures may be the same, or may be different from each other (with the second desired temperature being smaller than or equal to the first desired temperature). The fluid is therefore circulated through the heat exchanger pipe 106, heating up the brine inside the salt recovery tank 102, so the brine rises to a predetermined temperature to allow the vacuum system to process the water vapor. Such temperature may be, for example, at least 108 degrees Fahrenheit. Then the first vacuum pump 110 can be turned on to lower the vacuum pressure in the salt recovery tank to a first predetermined pressure lower than atmospheric pressure, that may be, for example approximately 27 inHg or as high as 10 mbars, causing the water in the brine to evaporate while the temperature of the brine is lower than boiling temperature at atmospheric pressure, and removing the water vapor which is then transferred into the recycled water tank 112. The recycled water tank 112 is kept at atmospheric pressure. In this manner the vapor removed from the salt recovery tank 102 at the first pressure liquefies at atmospheric pressure in the recycled water tank 112

It is possible that an oil residue will form on top of the water in the recycled water tank 112. If the recycled water in the recycled water tank 112 is to be circulated into a water desalination system, removing the oil residue form the top surface of the tank is recommended before circulating the recycled water from the recycled water tank into the water desalination system. As mentioned above, in some embodiments of the present invention, once enough brine has been turned to vapor, the first vacuum pump 110 is turned off and the second vacuum pump 172 takes over to quickly pump the water vapor out of the salt recovery tank 102.

Once enough water has been removed from the brine, solid salt deposits on the bottom of the trough 102a. The circulation pump 108 and the first vacuum pump 110 (and the second vacuum pump 172, if present) are turned off. Optionally, the heater 105 is turned off as well. The lid 102b is removed to open the trough 102a. The salt that remains inside the trough 102 can be removed by a (portable) vacuum cleaner and can later be packaged into a container or bagged.

Figure 6:
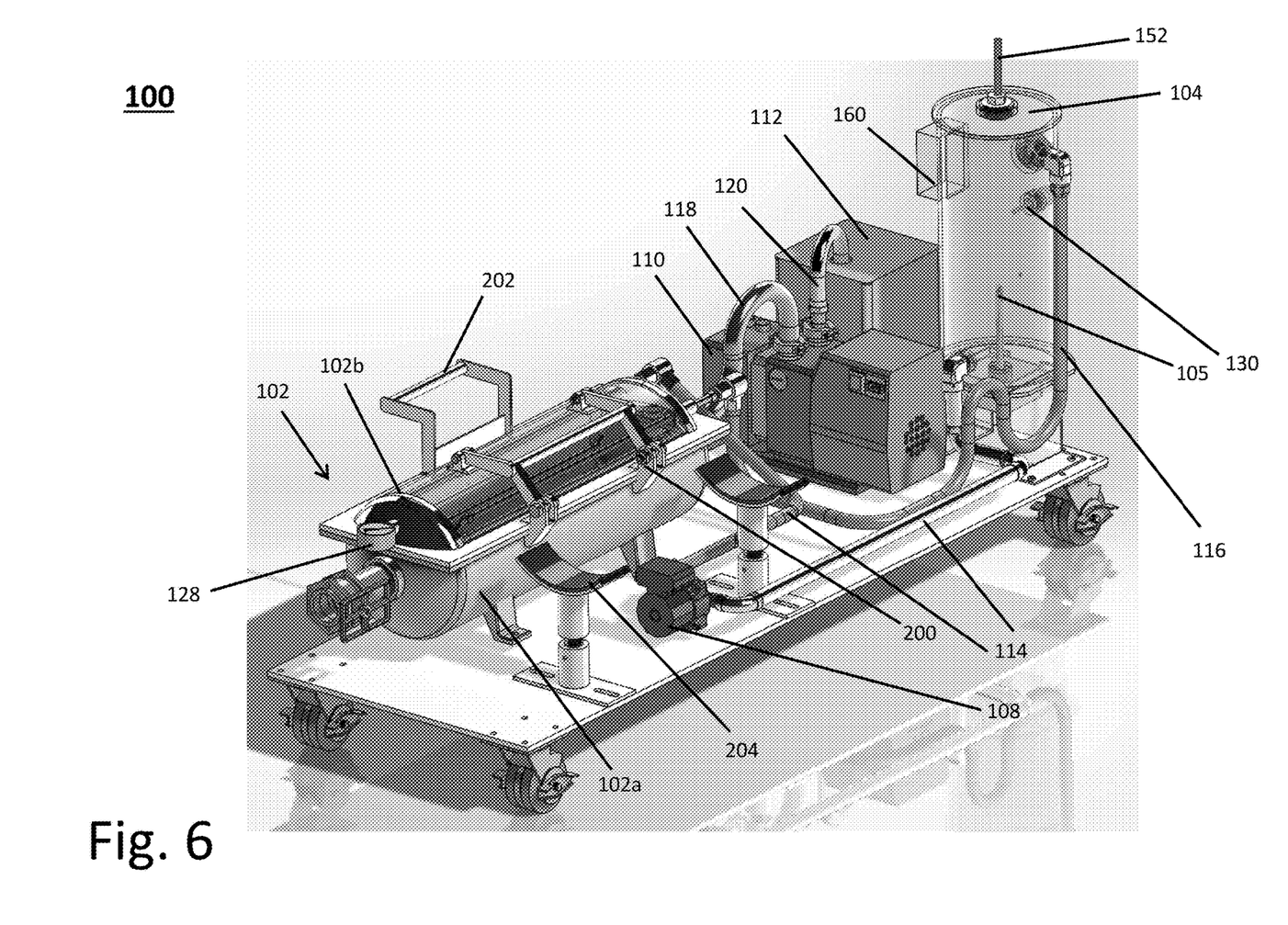
FIG. 6 illustrates a salt recovery system of the present invention with a small salt recovery tank with the lid closed.
Figure 7:
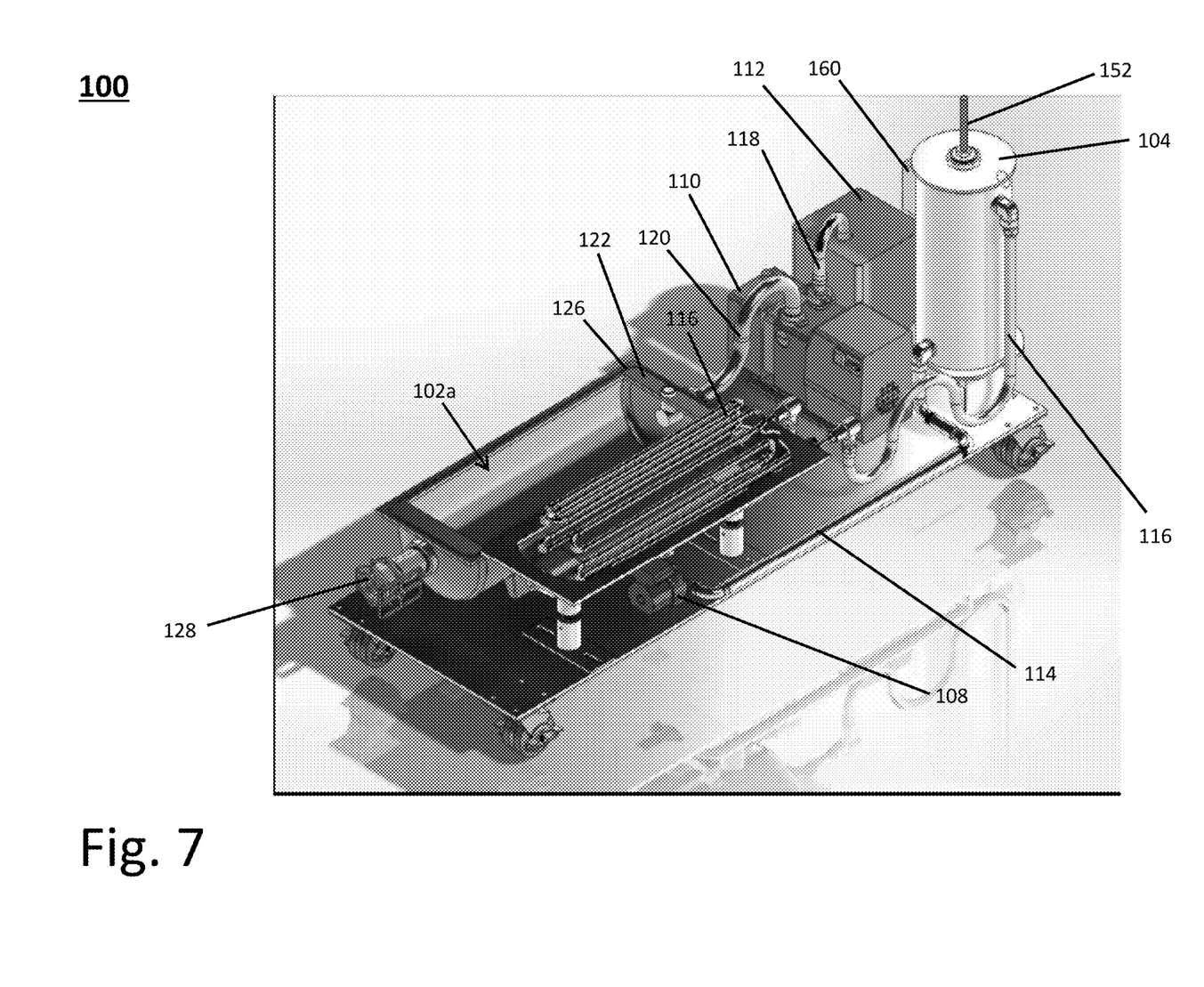
FIG. 7 illustrates a salt recovery system of the present invention with a small salt recovery tank with the lid open.

FIG. 6 illustrates a salt recovery system 100 of the present invention with a small salt recovery tank 102 with the lid closed. FIG. 7 illustrates a salt recovery system 100 of the present invention with a small salt recovery tank 102 with the lid open.

If the lid is light enough (for example, under 35 pounds), the lid may be opened and closed manually by a user. In the example of FIGS. 6 and 7, the lid 102b is joined to the trough 102a via one or more hinges 200, so the lid 102b can be rotate around the hinges 200 to open and close the trough 102a. In some embodiments of the present invention, a handle 202 is joined to the lid 102b, to facilitate the opening and closing of the lid 102b by the user. In some embodiments of the present invention on or more cradles 204 are configured to support at least some of the weight of the lid 102b when the lid 102b is open. In some embodiment of the present invention, the height of the cradles 204 is adjustable.

It should be noted that in FIGS. 6 and 7, even though the lid is in different position, the fluid lines 114 and 116 are joined to the heat exchanger pipe 116, due to the fact that the fluid lines include compliant material. Moreover, even though in FIGS. 6 and 7 only the first vacuum pump 110 is shown, the system of FIGS. 6 and 7 can also include the second vacuum pump 172 as shown in FIG. 3b.

FIGS. 8-11 illustrate a salt recovery system 100 in which the lid 102b of the salt recovery tank is heavy. In different jurisdiction, government regulations are in place to decrease or prevent injury. Some regulations prohibit persons from lifting weights higher than certain threshold especially during work-related operations. In the United States of America, NIOSH (National Institute for occupational safety and health) regulations place the weight limit to 35 lbs.

Figure 8:
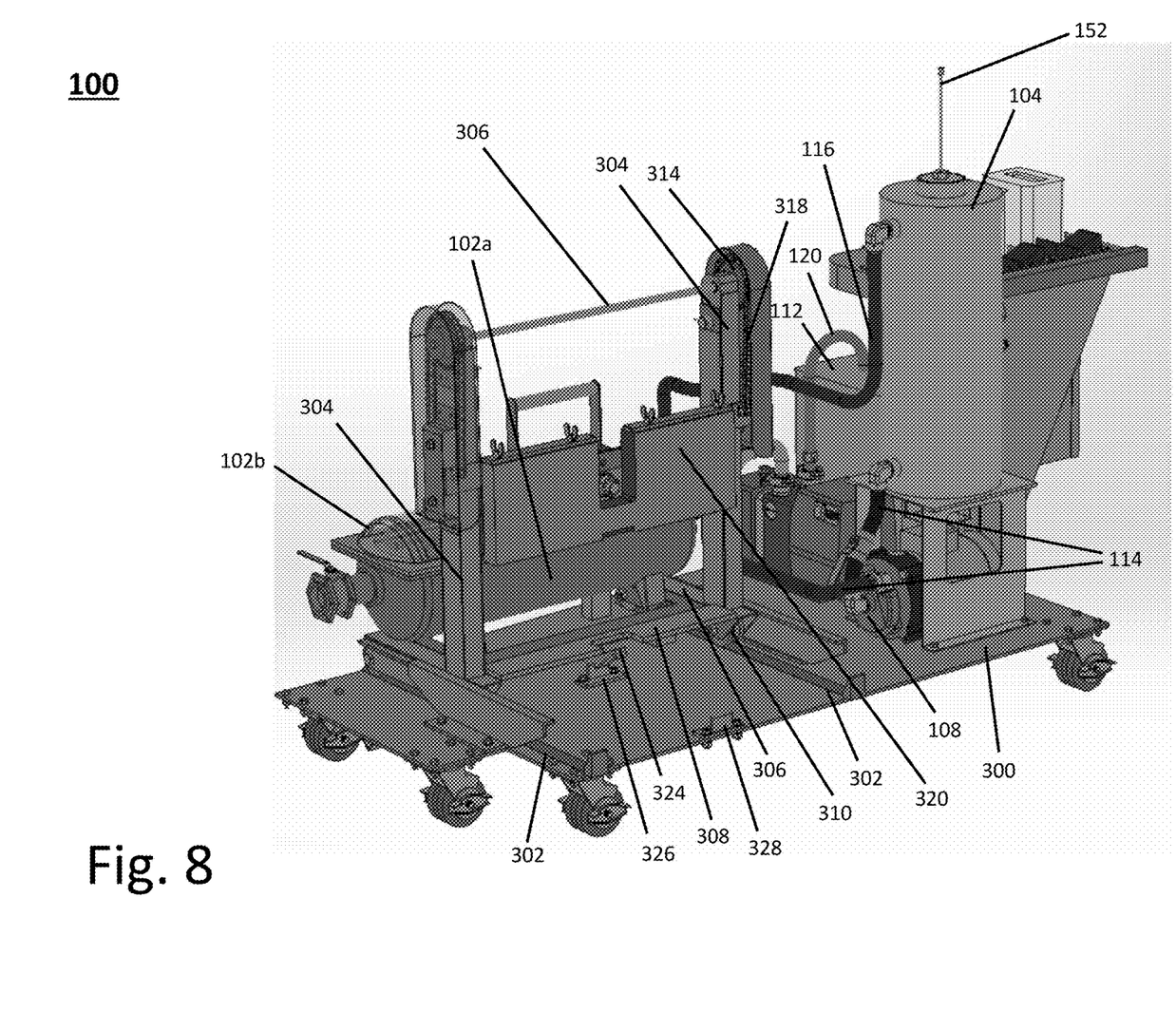
FIG. 8 illustrates a salt recovery system of the present invention with a large salt recovery tank with the lid closed.
Figure 9:
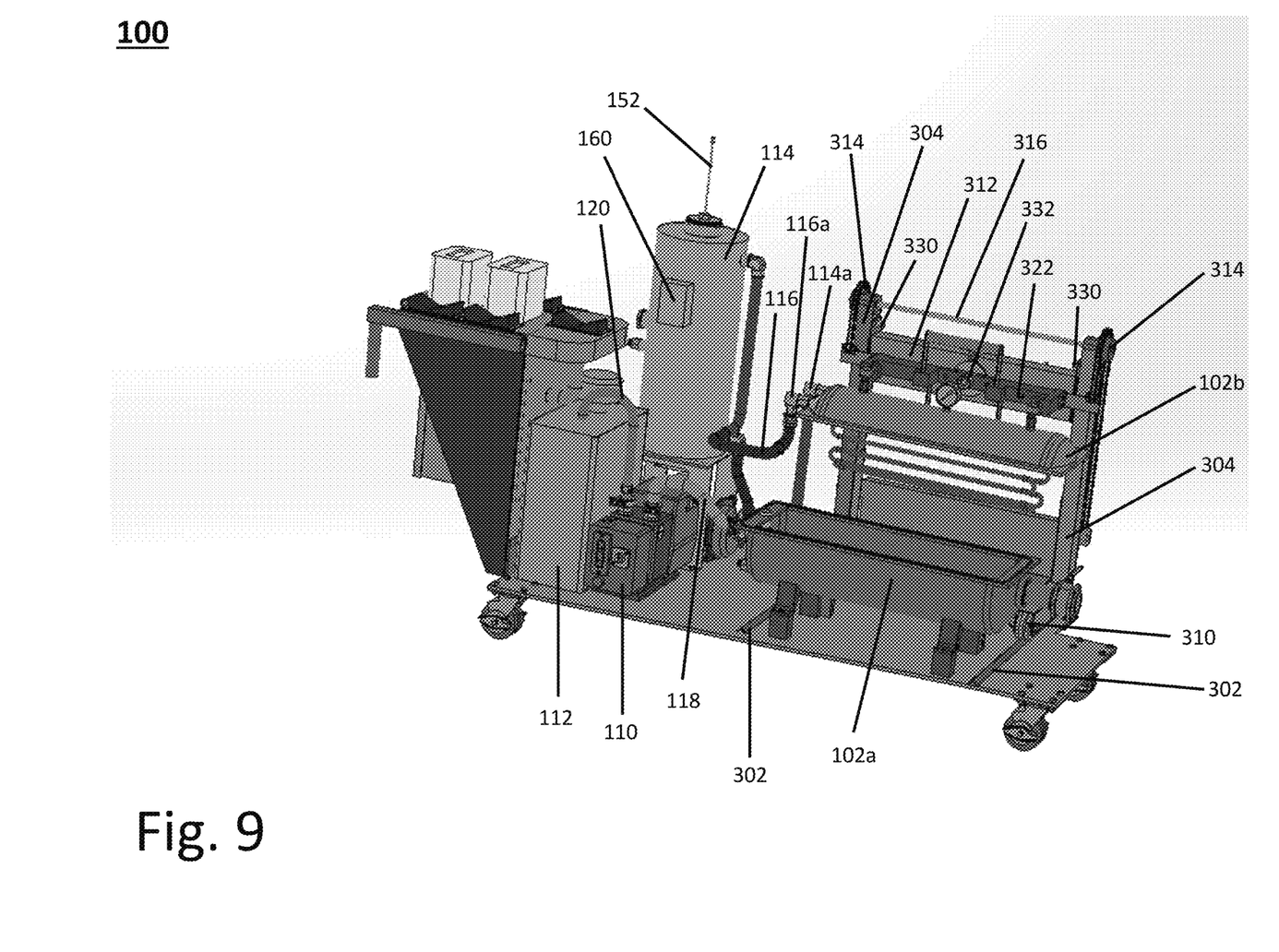
FIGS. 9 and 10 illustrate different views a salt recovery system of the present invention with a large salt recovery tank with the lid open.
Figure 10:
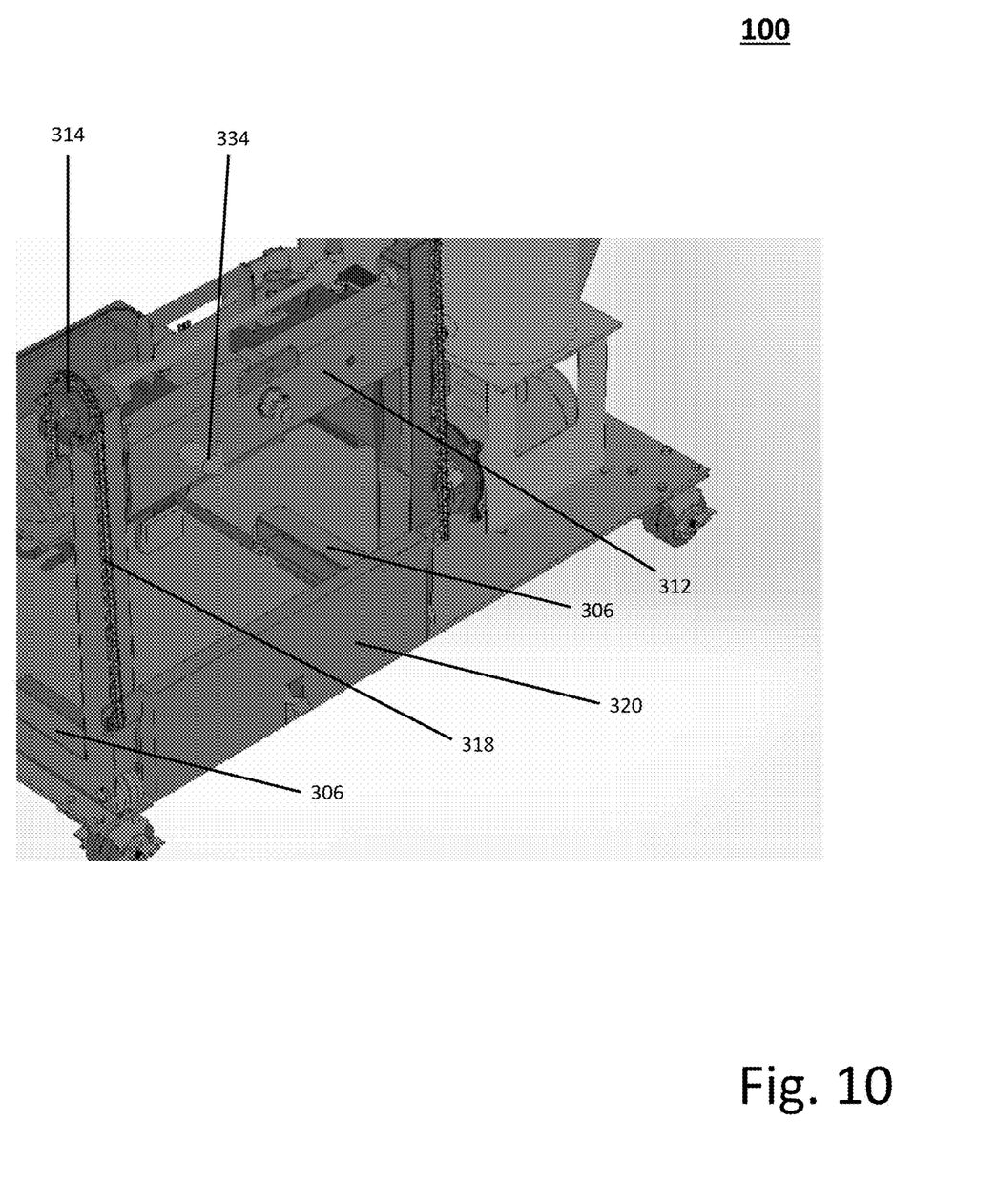
Figure 11:
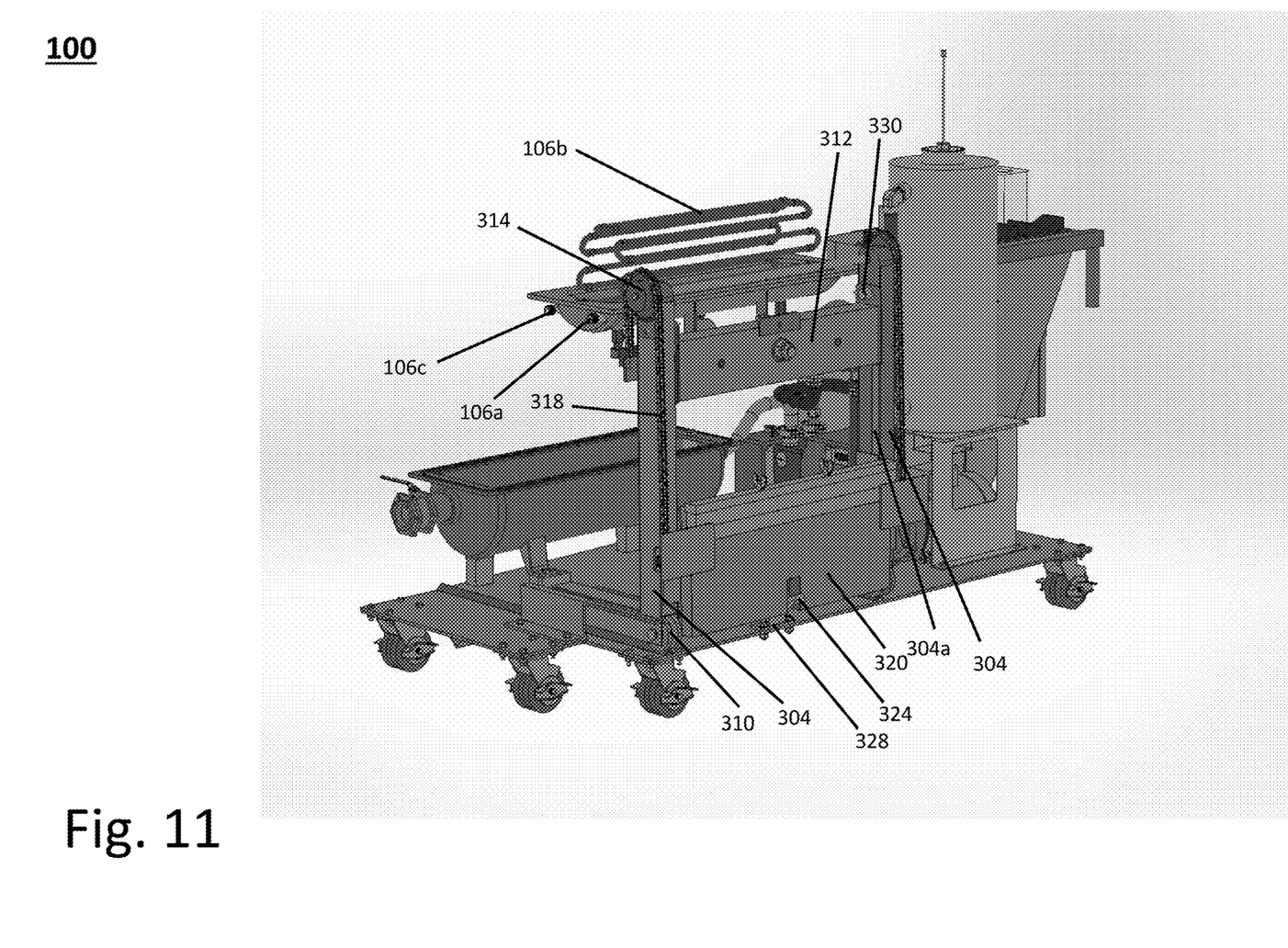
FIG. 11 illustrates a salt recovery system of the present invention with a large salt recovery tank with the lid open and rotated upward.

The salt recovery system 100 of FIGS. 8-11 includes a lifting apparatus compliant with NIOSH regulations and configured to move a lid 102b heavier than 35 lbs to open and close the trough 102a, without a need for the user to lift the lid. FIG. 8 illustrates a salt recovery system 100 of the present invention with a large salt recovery tank with the lid closed. FIGS. 9 and 10 illustrate different views of a salt recovery system 100 of the present invention with a large salt recovery tank with the lid open. FIG. 11 illustrates a salt recovery system of the present invention with a large salt recovery tank with the lid open and rotated upward.

The lifting apparatus includes a horizontal support panel 300, at least two rails 302 parallel to each other disposed on the support panel 300, and a crane assembly configured to move along the rails 302. The trough 102a is fixed to the support panel 300.

The crane assembly includes two grooved vertical beams 304, horizontal supports 306, a bar 308 connecting the horizontal supports, wheels 310, a movable beam 312, two sprockets 314, a horizontal shaft 316, two chains 318, a counterweight 320, and a strongback 322.

The two vertical grooved beams 304 have vertical grooves 304a facing each other. Each vertical grooved beam 304 has a forward face facing the trough 102a and a rear face facing away from the trough 102a. The horizontal supports 306 support the vertical beams 304 and extend horizontally below the vertical beams 304. The horizontal supports are parallel to the rails 302 and aligned with the rails 302.

The bar 308 connects the horizontal supports 306 in order to maintain the horizontal supports parallel to each other and at the desired distance from each other. The 310 wheels are joined to a lower surface of the horizontal supports 306 and are configured to cooperate with the rails 302 to move the crane assembly along the rails 302.

The movable beam 312 is located between the vertical beams 304 and is constrained by the vertical grooves 304a, such that the movable beam 312 can be only moved vertically along the grooves 304a.

The two sprockets 314 are parallel to each other, and are located on respective vertical beams 304. The horizontal shaft 316 is perpendicular to the sprockets and traverses the centers of the two sprockets. The shaft 316 is fixedly joined to the sprockets so that the shaft rotates with the sprockets 314, such that rotation of one sprocket causes the same rotation of the other sprocket.

Each of the chains 318 cooperates with a respective sprocket 314. Each chain has a first end and a second end. The counterweight 320 is joined to the first ends of the two chains 318 and is located behind the vertical beams 304. The strongback 322 is joined to the second ends of the two chains and is joined to a front of movable beam 312 so that it moves vertically with the movable bean 312.

The lid 102b is joined to the strongback 322. In this manner, when the strongback 322 is elevated, the lid is elevated as well. The combined weight of the lid 102b, strongback 322, and movable beam 314 is balanced by the counterweight 320. In this manner, weakly pushing down on the counterweight 320 causes the sprockets to turn to elevate the lid 102b to rise, and pushing down on the lid 102b causes the sprockets to turn in the opposite direction, causing the counterweight 320 to rise and the lid 102b to descend.

In FIG. 8, the 102b closes the trough 102a. The crane assembly is at its forward position, and the counterweight is elevated, so the 106. In some embodiments of the present invention, the salt recovery system 100 includes a spring locking mechanism 324, a forward stop 326, and rear stop 328. The rear stop 328 is joined to the horizontal support panel 300 at or near a rear portion of the horizontal support panel 300. The forward stop 326 is located on the horizontal support panel 300 ahead of the rear stop 326, between the rear stop 326 and the trough 102a. The spring locking mechanism 324 is attached to the bottom of the bar 308 and engages with the stops 326 and 328 after having moved over them. When the spring locking mechanism 324 engages either stop 326 and 328, the crane assembly is locked in place and cannot move until a user disengages the spring locking mechanism 324 from the stop. This, in FIG. 8, the spring locking mechanism 324 is engaged with the forward stop 326.

In FIG. 9, the lid 102b is elevated and locked into the elevated position by joining the movable beam 312 to both vertical beams 304 via locking pins 330 that traverse sections of the movable 312 beam and of the vertical beams 304. The locking of the lid 102b into the elevated position is important, as the in the elevated position, the heat exchanging portion 106b clears the trough 102a and allows the lid 102b to be moved backward without damaging the heat exchanging portion 106b.

In FIG. 11, the crane assembly is moved to its rearmost position and the spring locking mechanism 324 engages with the rear stop 328, locking the crane assembly.

In some embodiments of the present invention, the strongback 322 is joined to the movable beam 312 via a rotatable pivot 332, such that the strongback (together with the attached lid 102b) can rotate with respect to the movable beam 312. Generally, a pin 334 selectively locks the strongback 322 to the movable beam 322 in order to selectively prevent the rotation of the strongback 322 and prevent the collisions between the lid 102b and other portions of the salt recovery system 100, as shown in the detail of FIG. 10. However, then the crane assembly has reached its rearmost position, the lid 102b is far enough from the other elements of the system 100 that it can be rotated (along with the strongback 322) so the heat exchanging portion 106b faces upwards. The pin 334 is then used to fix the lid into the position, in order to enable inspection of the inside of the lid and of the heat exchanging portion 106b, for example to look for leaks in the heat exchanging portion 106b.

In FIG. 11 it can be seen that the fluid lines are not attached to the input 106a and output 106c. In some embodiments of the present invention the fluid line 114 is removably joined to the input 106a via a quick disconnect unit 114a, while the fluid line 116 is removably joined to the output 106c via a quick disconnect unit 116a, as seen in FIG. 9. These removable connections enables the fluid lines to be removed from the input 106a and the output 106c to allow the lid 102b to rotate without damaging the fluid lines.

It should be noted that even though in FIGS. 8-11 only the first vacuum pump 110 is shown, the system of FIGS. 8-11 can also include the second vacuum pump 172 as shown in FIG. 3b.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

What is claimed is:

1. A salt recovery system, comprising:
   a) a salt recovery tank, configured to receive and hold brine;
   b) a fluid tank, configured to hold a fluid and comprising a heater configured and heat the fluid in the fluid tank;
   c) a heat exchanger pipe, comprising:
      c1) an inlet located outside the salt recovery tank and configured to receive the fluid from the fluid tank;
      c2) a heat exchanging portion extending inside the salt recovery tank and configured to enable heat exchange between the fluid in the heat exchanger pipe and the brine in the salt recovery tank;
      c3) an outlet outside the salt recovery tank and configured to release the fluid into the fluid tank;
   d) a circulation pump configured for driving a circulation of the fluid from the fluid tank, through the heat exchanger pipe, and back into the fluid tank;
   e) a first vacuum pump configured to lower pressure inside the salt recovery tank, to facilitate evaporation of water in the brine and separation of the brine into water vapor and salt at a desired temperature, the first vacuum pump being configured to pump the water vapor out the salt recovery tank, such that salt remains in the salt recovery tank;
   f) a recycled water tank, configured to receive the water vapor from the first vacuum pump; and
   a second vacuum pump;
   wherein:
   the first vacuum pump is configured to lower the pressure inside the salt recovery tank to a first pressure and to extract the water vapor at a first pumping speed;
   the second vacuum pump is configured to maintain the pressure inside the salt recovery tank at a second pressure higher than the first pressure and to extract the water vapor at a second pumping speed higher than the first pumping speed;
   the salt recovery system comprises a first valve between the salt recovery tank and the first vacuum pump, and a second valve between the salt recovery tank the second vacuum pump,
   the first vacuum pump is configured to be operated with the first valve open to lower the pressure in the salt recovery tank to the first pressure and to extract the water vapor from the salt recovery tank at the first pumping speed for a predetermined time period, while the second vacuum pump is operated to warm up with the second valve closed;
   at the end of the predetermined time period, the first valve is configured to be closed and the second valve is configured to be opened such that the second vacuum pump maintains the pressure within the salt recovery tank at the second pressure and extracts water vapor from the salt recovery tank at the second pumping speed.

2. The salt recovery system of claim 1, configured to receive the brine from a water desalination system into the salt recovery tank;
wherein the recycled water tank is associated with a pump configured to circulate recycled water generated by a liquefying of the water vapor into the water desalination system.

3. A salt recovery system, comprising:
a) a salt recovery tank, configured to receive and hold brine;
b) a fluid tank, configured to hold a fluid and comprising a heater configured and heat the fluid in the fluid tank;
c) a heat exchanger pipe, comprising:
c1) an inlet located outside the salt recovery tank and configured to receive the fluid from the fluid tank;
c2) a heat exchanging portion extending inside the salt recovery tank and configured to enable heat exchange between the fluid in the heat exchanger pipe and the brine in the salt recovery tank;
c3) an outlet outside the salt recovery tank and configured to release the fluid into the fluid tank;
d) a circulation pump configured for driving a circulation of the fluid from the fluid tank, through the heat exchanger pipe, and back into the fluid tank;
e) a first vacuum pump configured to lower pressure inside the salt recovery tank, to facilitate evaporation of water in the brine and separation of the brine into water vapor and salt at a desired temperature, the first vacuum pump being configured to pump the water vapor out the salt recovery tank, such that salt remains in the salt recovery tank;
f) a recycled water tank, configured to receive the water vapor from the first vacuum pump;
wherein:
the salt recovery tank comprises a trough and a lid, the lid being removably joined to the trough and configured to selectively open and close the trough;
when the lid is closed, the lid and trough enclose an inner cavity, sealing the inner cavity from an outer environment outside the salt recovery tank, to at least decrease entry of air from the outer environment into the inner cavity.

4. The salt recovery system of claim 3, comprising a first fluid line connecting the fluid tank to the inlet and a second fluid line connecting the outlet to the fluid tank, wherein the first fluid line and the second fluid line are compliant.

5. The salt recovery system of claim 3, wherein:
the trough has a first lip extending horizontally outward from a rim of the trough;
the lid has a second lip extending horizontally outward from a rim of the lid;
when the lid is closed the trough, the first lip is aligned with the second lip.

6. The salt recovery system of claim 5, comprising a sealing unit located between the first lip and the second lip, configured to enhance sealing of the inner cavity from the outer environment.

7. The salt recovery system of claim 3, wherein the heat exchanger pipe is joined to the lid, such that the inlet ad outlet are located outside the lid and traverse the lid to connect to the heat exchanging portion.

8. The salt recovery system of claim 7, wherein the heat exchanging portion extends toward the trough, such that when the lid closes the trough the heat exchanging portion is at least partially inside the trough.

9. The salt recovery system of claim 3, wherein lid is joined to the trough via at least one hinge, and is configured to be rotated around the hinge to open and close the trough.

10. The salt recovery system of claim 9, comprising at least one cradle configured to support the lid when the lid is opened.

11. The salt recovery system of claim 3, comprising a vacuum gauge configured for measuring and displaying an air pressure inside the salt recovery tank.

12. The salt recovery system of claim 3, comprising a first temperature sensor configured to measure and display a temperature of the fluid in the fluid tank.

13. The salt recovery system of claim 12, comprising a second temperature sensor configured to measure and display a temperature of the fluid in the fluid tank.

14. The salt recovery system of claim 13, comprising a flow control unit configured to:
receive a first temperature measurement from the first temperature probe and a second temperature measurement from the second temperature probe;
compare the first temperature measurement to a first threshold temperature;
compare the second temperature measurement to a second threshold temperature;
enable an activation by a user of the circulation pump, when the first temperature of the measurement is higher than the first threshold temperature and the second temperature of the measurement is higher than the second threshold temperature.

15. The salt recovery system of claim 3, comprising a lifting apparatus to move the lid to open and close the trough, wherein the lifting apparatus comprises:
a horizontal support panel, upon which the trough is fixed;
at least two rails parallel to each other and disposed on the horizontal support panel; and
a crane assembly configured to move along the at least two rails;
the crane assembly comprising:
two vertical grooved beams, each having a vertical groove, the vertical grooves facing each other, each vertical grooved beams having a forward face facing the trough and a rear face facing away from the trough;
horizontal supports, supporting the vertical grooved beams and extending horizontally below the vertical grooved beams parallel to and aligned with the rails;
a bar connecting the horizontal supports;
wheels joined to a lower surface of the horizontal supports and configured to cooperate with the rails to move the crane assembly along the rails;
a movable beam located between the vertical grooved beams and constrained by the vertical grooves to move vertically along the vertical grooves;
two sprockets parallel to each other, each sprocket being located on the respective vertical grooved beam;
a horizontal shaft perpendicular to the sprockets and to the vertical grooved beams and traversing centers of the sprockets, the horizontal shaft being fixedly joined to the sprockets, to cause a rotation of one of the sprockets to generate the same rotation on another one of the sprockets;

two chains, each chain cooperating with a respective sprocket and having a first end and a second end;

a counterweight joined to the first ends of the chains and located behind the vertical grooved beams; and a strongback joined to the second ends of the chains and to a front surface of the movable beam, the strongback being joined to the lid;

wherein the counterweight behind the vertical beams balances a combined weight of the lid, the strongback, and the movable beam, such that pushing down on the counterweight causes the sprockets to turn in a first direction and elevate the lid, while pushing down on the lid causes the sprockets to turn in a second direction opposite to the first direction to cause the counterweight to rise and the lid to descend.

16. The salt recovery system of claim 15, further comprising:

a rear stop joined to the horizontal support panel at or near a rear portion of the horizontal support panel;

a forward stop, located on the horizontal support panel ahead of the rear stop, between the rear stop and the trough; and a spring locking mechanism attached to a bottom of the bar and configured to:

engage with the rear stop when moved over the rear stop, to lock the crane assembly in place in a rear position and preventing the crane assembly from moving along the rails until the spring local mechanism is disengaged by a user from the rear stop; and engage with the forward stop when moved over the forward stop, to lock the crane assembly in place in a forward position and preventing the crane assembly from moving along the rails until the spring local mechanism is disengaged by a user from the forward stop.

17. The salt recovery system of claim 15, further comprising locking pins configured for traversing portions of the movable beam and upper portions of the vertical grooved beams to lock the movable beam on an elevated location, to lock the lid in an elevated position.

18. The salt recovery system of claim 15, wherein the strongback is joined to the movable beam via a rotatable pivot, to enable rotation of the strongback together with the lid with respect to the movable beam.

19. The salt recovery system of claim 18, comprising a pin configured to selectively lock the strongback to the movable beam to selectively prevent the rotation of the strongback with respect to the movable beam.

20. The salt recovery system of claim 3, further comprising a second vacuum pump, wherein:

the first vacuum pump is configured to lower the pressure inside the salt recovery tank to a first pressure and to extract the water vapor at a first pumping speed;

the second vacuum pump is configured to maintain the pressure inside the salt recovery tank at a second pressure higher than the first pressure and to extract the water vapor at a second pumping speed higher than the first pumping speed;

the salt recovery system comprises a first valve between the salt recovery tank and the first vacuum pump, and a second valve between the salt recovery tank the second vacuum pump;

the first vacuum pump is configured to be operated with the first valve open to lower the pressure in the salt recovery tank to the first pressure and to extract the water vapor from the salt recovery tank at the first pumping speed for a predetermined time period, while the second vacuum pump is operated to warm up with the second valve closed;

at the end of the predetermined time period, the first valve is configured to be closed and the second valve is configured to be opened such that the second vacuum pump maintains the pressure within the salt recovery tank at the second pressure and extracts water vapor from the salt recovery tank at the second pumping speed.

* * * * *